United States Patent
Matsuda et al.

(10) Patent No.: US 10,450,626 B2
(45) Date of Patent: Oct. 22, 2019

(54) HIGH-STRENGTH HOT-DIP GALVANIZED STEEL SHEET EXCELLENT IN FORMABILITY AND METHOD OF PRODUCING SAME

(71) Applicant: JFE Steel Corporation, Tokyo (JP)

(72) Inventors: Hiroshi Matsuda, Tokyo (JP); Tatsuya Nakagaito, Tokyo (JP); Takayuki Futatsuka, Tokyo (JP); Shusaku Takagi, Tokyo (JP); Yasunobu Nagataki, Tokyo (JP)

(73) Assignee: JFE Steel Corporation, Tokyo (JP)

(*) Notice: Subject to any disclaimer, the term of this patent is extended or adjusted under 35 U.S.C. 154(b) by 88 days.

(21) Appl. No.: 15/462,241

(22) Filed: Mar. 17, 2017

(65) Prior Publication Data

US 2017/0191141 A1  Jul. 6, 2017

Related U.S. Application Data

(63) Continuation of application No. 11/886,622, filed as application No. PCT/JP2006/307788 on Apr. 6, 2006.

(30) Foreign Application Priority Data

May 30, 2005 (JP) .................. 2005-156601
Jan. 6, 2006 (JP) .................. 2006-001477

(51) Int. Cl.
| | |
|---|---|
| *C21D 9/46* | (2006.01) |
| *B32B 15/01* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/38* | (2006.01) |
| *C23C 2/02* | (2006.01) |

(Continued)

(52) U.S. Cl.
CPC .............. *C21D 9/46* (2013.01); *B32B 15/013* (2013.01); *C22C 38/002* (2013.01); *C22C 38/02* (2013.01); *C22C 38/04* (2013.01); *C22C 38/06* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C22C 38/40* (2013.01); *C23C 2/02* (2013.01); *C23C 2/06* (2013.01); *C23C 2/28* (2013.01); *C23F 17/00* (2013.01); *C21D 2211/001* (2013.01)

(58) Field of Classification Search
CPC .................................. C21D 9/46; C22C 38/04
USPC ......................................................... 148/320
See application file for complete search history.

(56) References Cited

FOREIGN PATENT DOCUMENTS

| JP | 05-070886 A | 3/1993 |
|---|---|---|
| JP | 06-145788 A | 5/1994 |

(Continued)

*Primary Examiner* — Weiping Zhu
(74) *Attorney, Agent, or Firm* — DLA Piper LLP (US)

(57) ABSTRACT

A high-strength hot-dip galvanized steel sheet excellent in formability includes, on the basis of mass percent, 0.05-0.3% C, 1.4% or less (including 0%) Si, 0.08%-3% Mn, 0.003-0.1% P, 0.07% or less S, 0.1-2.5% Al, 0.1-0.5% Cr, and 0.007% or less N, Si+Al≥0.5%, and the balance being Fe and incidental impurities, wherein the steel sheet has a retained austenite content of 3% or more by volume fraction, a stretch-flange formability λ>50% and wherein the average aspect ratio (major axis/minor axis) of retained austenite grains is less than 2.5.

5 Claims, 7 Drawing Sheets

(51) Int. Cl.
    *C23C 2/28*          (2006.01)
    *C22C 38/20*        (2006.01)
    *C22C 38/22*        (2006.01)
    *C22C 38/24*        (2006.01)
    *C22C 38/26*        (2006.01)
    *C22C 38/28*        (2006.01)
    *C22C 38/32*        (2006.01)
    *C22C 38/40*        (2006.01)
    *C23C 2/06*         (2006.01)
    *C23F 17/00*        (2006.01)

(56)           References Cited

FOREIGN PATENT DOCUMENTS

| | | |
|---|---|---|
| JP | 06-145892 A | 5/1994 |
| JP | 2000-054072 A | 2/2000 |
| JP | 2001-234281 A | 8/2001 |
| JP | 2001-254138 A | 9/2001 |
| JP | 2002-302734 A | 10/2002 |
| JP | 2002-309334 A | 10/2002 |
| JP | 2004-190050 A | 7/2004 |
| JP | 2004-256836 A | 9/2004 |
| JP | 2004-292891 A | 10/2004 |
| JP | 2004292891 A * | 10/2004 |
| JP | 2005-029867 A | 2/2005 |
| WO | 2004/063410 A1 | 7/2004 |

* cited by examiner

HIGH-STRENGTH HOT-DIP GALVANIZED STEEL SHEET EXCELLENT IN FORMABILITY AND METHOD OF PRODUCING SAME

RELATED APPLICATIONS

This application is a continuation of U.S. Ser. No. 11/886,622, filed Sep. 17, 2007, which is a § 371 of International Application No. PCT/JP2006/307788, filed Apr. 6, 2006, which is based on Japanese Patent Application Publication No. 2005-156601, filed May 30, 2005, and Japanese Patent Application Publication No. 2006-001477, filed Jan. 6, 2006.

TECHNICAL FIELD

This disclosure relates to a high-strength hot-dip galvanized steel sheet having excellent formability and used in industrial fields such as automobiles and electrics, and relates to a method of producing the high-strength hot-dip galvanized steel sheet.

BACKGROUND

In recent years, from the viewpoint of global environment conservation, the improvement of fuel efficiency of automobiles has been a critical issue. Development in which an increase in the strength of materials used for automobile bodies reduces thicknesses to lighten automobile bodies has been actively made. In general, however, an increase in the strength of steel sheets degrades formability. Thus, development of materials having high strength and high formability has been required.

TRIP steel utilizing transformation-induced plasticity of retained austenite has been receiving attention as a material satisfying such requirements. Various types of steel sheet have been developed to effectively utilize the effect. For example, Japanese Patent No. 2660644 discloses a steel sheet excellent in press formability by controlling the chemical composition and the amount of retained austenite in a steel sheet. Japanese Patent No. 2704350 discloses a method for producing such a steel sheet. Japanese Patent No. 3317303 discloses a steel sheet containing 5% or more retained austenite and having excellent formability (in particular, local ductility). Japanese Unexamined Patent Application Publication No. 2000-54072 discloses a steel sheet containing 3% or more retained austenite, having an average axial ratio of 3 to 20, and having an average hardness of a matrix of 270 HV or less and thus having a balance between stretch and stretch-flange formability.

Japanese Unexamined Patent Application Publication Nos. 2002-302734 and 2002-309334 each disclose a steel sheet containing 3% or more retained austenite and either 50% or more tempered martensite or 50% tempered bainite and thus having a balance between high ductility and high stretch-flange formability. Japanese Unexamined Patent Application Publication No. 2001-254138 discloses a steel sheet having an appropriate volume fraction of retained austenite, an appropriate content of carbon, and an appropriate aspect ratio in a ferrite phase and thus having excellent formability after preworking, and a method for producing the same.

Japanese Unexamined Patent Application Publication No. 2004-256836 discloses a high-tensile-strength hot-dip galvanized steel sheet having a sufficient strength-elongation balance and excellent fatigue properties and having a content of retained austenite of 3% or more, wherein 70% or more of grains of retained austenite has a ratio of the major axis to the minor axis of 0.2 to 0.4, i.e., an aspect ratio of 2.5 to 5. Japanese Unexamined Patent Application Publication No. 2004-292891 discloses a steel sheet also having excellent hole expansibility obtained by adjusting the steel sheet disclosed in JP '836 in such a manner that the proportion of martensite in a low-temperature transformation phase is 20% or less and that the ratio of the hardness of bainite in low-temperature transformation phase to the hardness of ferrite as a main phase is 2.6 or less.

However, the above-described known art has problems described below. In the steel sheet disclosed in each of JP '644 and JP '350, although sufficient ductility is obtained by utilizing the TRIP effect, stretch-flange formability is inferior to that of ferrite-martensite dual-phase steel. In the steel sheet disclosed in JP '303, local elongation is improved because strain-induced transformation does not easily occur even in a high strain region. However, strain-induced transformation occurs in a portion, such as a punched end face, subjected to high deformation, thus resulting in a small effect of improving stretch-flange formability after that. The steel sheet disclosed in JP '072 needs to contain 3% or more retained austenite and has an average axial ratio of 3 to 20. To form a lath shape having an average axial ratio of 3 or more, it is necessary to sufficiently promote bainite transformation during a final heat treatment step. That is, it is necessary to prolong an austempering time during the final heat treatment step. However, the austempering time is difficult to ensure in the known hot-dip galvanizing line in particular. Therefore, it is necessary to modify the process, e.g., a reduction in line speed, thereby reducing productivity.

In the steel sheet disclosed in each of JP '734 and JP '334, it is necessary to contain 3% or more retained austenite and either 50% or more tempered martensite or 50% or more tempered bainite. When a bainite structure or a martensite structure is used as a pre-structure, it is necessary to perform heat treatment under conditions different from usual conditions during a hot-rolling step or to perform continuous annealing twice. In the case where the bainite or martensite structure is formed during the hot-rolling step, the resulting steel sheet has high strength after the hot-rolling step. This increases rolling force during cold rolling, thus restricting a line. When the annealing step is repeated twice, production costs are markedly increased.

The steel sheet disclosed in JP '138 needs to have an appropriate volume fraction of retained austenite, an appropriate content of carbon, and an appropriate aspect ratio in a ferrite phase. To increase the aspect ratio and the carbon content, it is necessary to perform austempering, in which the steel sheet is held for a relatively prolonged period of time in a bainite-transformation-temperature range. Thus, in a hot-dip galvanizing line that is not capable of ensuring a sufficient austempering time after annealing, it is necessary to modify the process, e.g., a reduction in line speed, thereby significantly reducing productivity. In the steel sheet disclosed in each of JP '836 and JP '891, a structure before final annealing needs to be a structure including a low-temperature transformation phase such as bainite or martensite. Such a structure needs to be formed during a hot-rolling step or by repeating an annealing step twice. Providing such a step restricts a production line and increases production costs, as described above.

It could be helpful to provide a high-strength hot-dip galvanized steel sheet having excellent formability, the steel sheet eliminating special pre-structure control and capable of being produced by using a hot-dip galvanized steel-sheet production line that is not capable of sufficiently ensuring an austempering time after annealing, and to provide a method for producing the high-strength hot-dip galvanized steel sheet.

SUMMARY

We conducted studies on factors affecting mechanical properties of a high-strength hot-dip galvanized steel sheet. Specifically, we investigated the relationship among chemical compositions, austempering conditions, and structures formed (states of retained austenite) in detail. Furthermore, we clarified the relationship between the structures formed and the mechanical properties. Therefore, we found that the incorporation of Cr in an appropriate amount (0.1% to 0.5%) exhibits characteristics different from Cr-free steel and Cr-rich steel; and the active utilization of the characteristics results in a steel sheet excellent in mechanical properties different from those in the known art.

We thus provide items (1) to (6) described below.
(1) A high-strength hot-dip galvanized steel sheet excellent in formability contains, on the basis of mass percent, 0.05-0.3% C, 1.4% or less (including 0%) Si, 0.08%-3% Mn, 0.003-0.1% P, 0.07% or less S, 0.1-2.5% Al, 0.1-0.5% Cr, and 0.007% or less N, Si+Al≥0.5%, and the balance being Fe and incidental impurities, wherein the steel sheet has a retained austenite content of 3% or more by volume fraction, and wherein the average aspect ratio of retained austenite grains is 2.5 or less.
(2) The high-strength hot-dip galvanized steel sheet excellent in formability according to item (1) further contains, on the basis of mass percent, at least one element selected from 0.005-2% V and 0.005-2% Mo.
(3) The high-strength hot-dip galvanized steel sheet excellent in formability according to item (1) or (2) further contains, on the basis of mass percent, at least one element selected from 0.01-0.5% Ti, 0.01-0.1% Nb, 0.0003-0.005% B, 0.005-2.0% Ni, and 0.005-2.0% Cu.
(4) A method for producing a high-strength hot-dip galvanized steel sheet excellent in formability includes annealing a steel sheet in a first temperature region having a temperature of 700° C. to 900° C. for 15 to 600 seconds, the steel sheet containing, on the basis of mass percent, 0.05-0.3% C, 1.4% or less (including 0%) Si, 0.08%-3% Mn, 0.003-0.1% P, 0.07% or less S, 0.1-2.5% Al, 0.1-0.5% Cr, and 0.007% or less N, Si+Al≥0.5%, and the balance being Fe and incidental impurities; and cooling the steel sheet to a second temperature region having a temperature of 360° C. to 490° C. at a cooling rate of 5° C./s or more, wherein a retention time in the second temperature region is controlled on the basis of Formula (1):

$$5 \leq t \leq 200 - 0.003 \times (T-350)^2 \quad (1)$$

where t represents the total retention time (second) in the temperature region having a temperature of 360° C. to 490° C., and T represents an average temperature (° C.) when the steel sheet is retained for the total retention time in the temperature region having a temperature of 360° C. to 490° C.
(5) The method for producing the high-strength hot-dip galvanized steel sheet excellent in formability according to item 4, wherein the steel sheet further contains, on the basis of mass percent, at least one element selected from 0.005-2% V and 0.005-2% Mo.
(6) In the method for producing the high-strength hot-dip galvanized steel sheet excellent in formability according to item 4 or 5, the steel sheet further contains, on the basis of mass percent, at least one element selected from 0.01-0.5% Ti, 0.01-0.1% Nb, 0.0003-0.005% B, 0.005-2.0% Ni, and 0.005-2.0% Cu.

We provide a high-strength hot-dip galvanized steel sheet having excellent formability, the steel sheet eliminating special pre-structure control and capable of being produced by using a hot-dip galvanized steel-sheet production line that is not capable of sufficiently ensuring an austempering time after annealing, and to provide a method for producing the high-strength hot-dip galvanized steel sheet.

DETAILED DESCRIPTION

A high-strength hot-dip galvanized steel sheet excellent in formability will be described in detail below.

Figure 1:
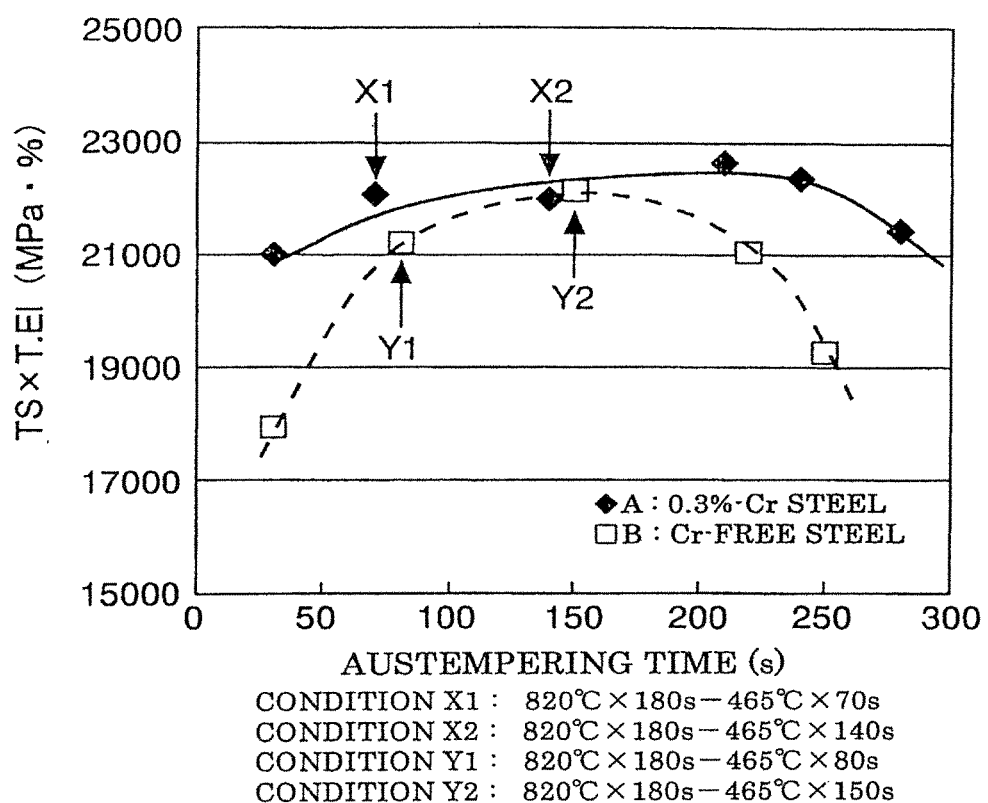
FIG. 1 is a graph showing the relationship between the austempering time and the TS×T. El balance of each of 0.3%-Cr steel and Cr-free steel.

The circumstances that led to our steel sheets and methods will be described. FIG. 1 is a graph showing the relationship between the austempering time and the TS×T. El balance. Steel A is a steel having a Cr content of 0.3%, and Steel B is Cr-free steel. As shown in FIG. 1, Steel A has satisfactory mechanical properties even when subjected to austempering for a short time, compared with Steel B. Steel A having satisfactory properties is maintained even when subjected to austempering for a long time, whereas in Steel B, mechanical properties are improved with increasing austempering time but are degraded with further increasing austempering time. That is, Steel B has a narrow range in which satisfactory properties are obtained. The fact that the satisfactory properties can be ensured by austempering for a short time shows that the steel sheet can be produced using a CGL line that is not capable of performing austempering for a long time without a reduction in line speed, which is advantageous in view of mass productivity (productivity). In producing a steel sheet with actual equipment, the line speed may be changed in response to the thickness of the sheet even when the same type of steel is used. The fact that mechanical properties are largely unchanged with the austempering time is advantageous from the viewpoint that the stability of the mechanical properties of the steel sheet is ensured in mass production.

Figure 2:
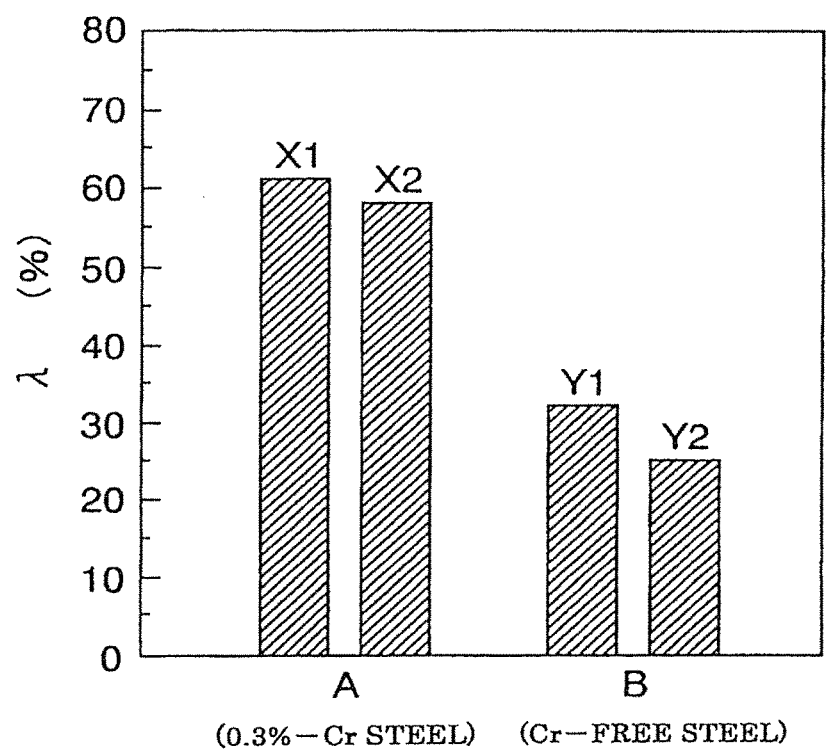
FIG. 2 is a graph showing the maximum hole-expanding ratio of each of 0.3%-Cr steel and Cr-free steel.

FIG. 2 shows the evaluation results of stretch-flange formability in terms of the maximum hole-expanding ratio λ (%) of each of sheets of Steel A subjected to heat treatment under conditions X1 and X2 and sheets of Steel B subjected to heat treatment under conditions Y1 and Y2. This figure demonstrates that although these steel sheets are comparable in TS×T. El balance, Steel A containing Cr has stretch-flange formability superior to that of Steel B not containing Cr.

We have conducted detailed investigation of causes for such difference based on the absence or presence of Cr, and found as follows: Hitherto, to obtain high ductility in TRIP steel, the promotion of an increase in carbon content in retained austenite by bainite transformation is believed to result in higher ductility. In contrast, when an appropriate amount of Cr is incorporated, sufficient properties are obtained even in the case of retained austenite having a shape relatively close to a block due to insufficient bainite transformation.

Figure 3:
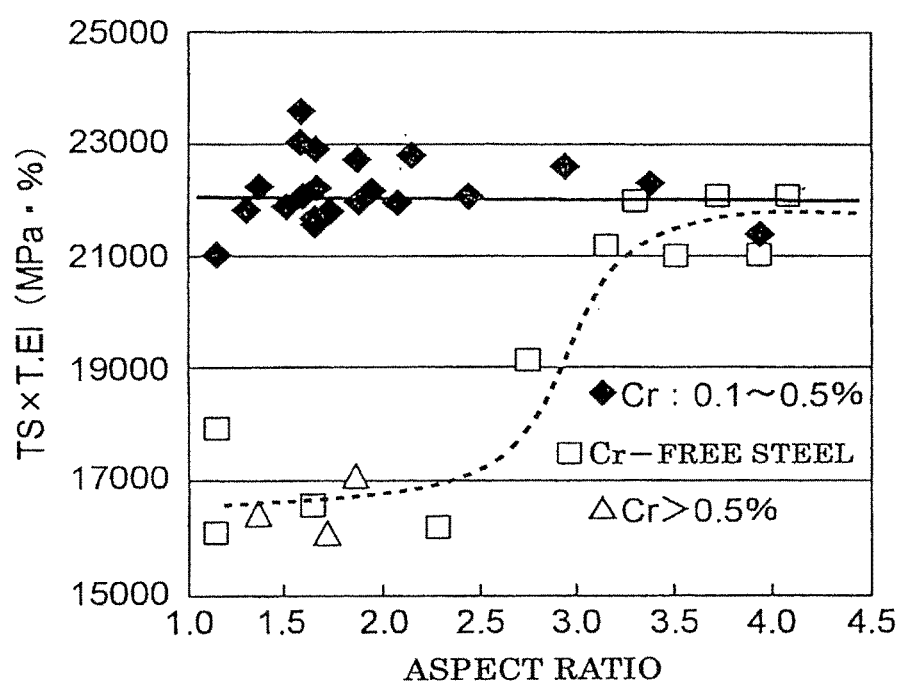
FIG. 3 is a graph showing the relationship between the aspect ratio and the TS×T. El balance of retained-austenite grains.
Figure 4:
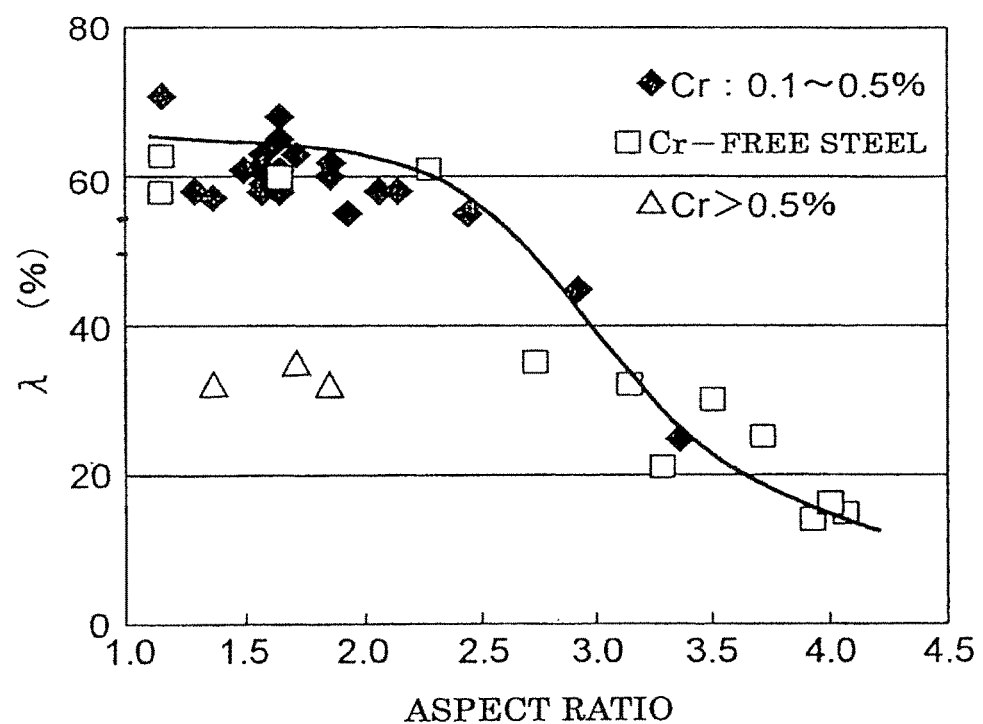
FIG. 4 is a graph showing the relationship between the aspect ratio and the maximum hole-expanding ratio of retained-austenite grains.

This point will be described in further detail. FIG. 3 shows the relationship between the aspect ratio and the TS×T. El balance of retained-austenite grains. FIG. 4 shows the relationship between the aspect ratio and the maximum hole-expanding ratio λ of retained-austenite grains. As shown these figures, in Cr-free steel, a low aspect ratio results in a high hole-expanding ratio, satisfactory stretch-flange formability, and a low TS×T. El balance. In contrast, a high aspect ratio improves the TS×T. El balance and degrades stretch-flange formability. In the case where an appropriate amount of Cr is incorporated (Cr: 0.1% to 0.5%), a high aspect ratio exhibits the same tendency as that of Cr-free steel. Even at a low aspect ratio, the TS×T. El balance is not reduced. An amount of Cr incorporated exceeding 0.5% does not result in a material having a high aspect ratio. The results demonstrate that the aspect ratio and TS×T. El balance are low and that hole-expanding ratio is not improved.

Consequently, it is found that a steel sheet having a balance between high ductility and high stretch-flange formability can be obtained by appropriately incorporating Cr and ensuring a low aspect ratio (2.5 or less).

Figure 5:
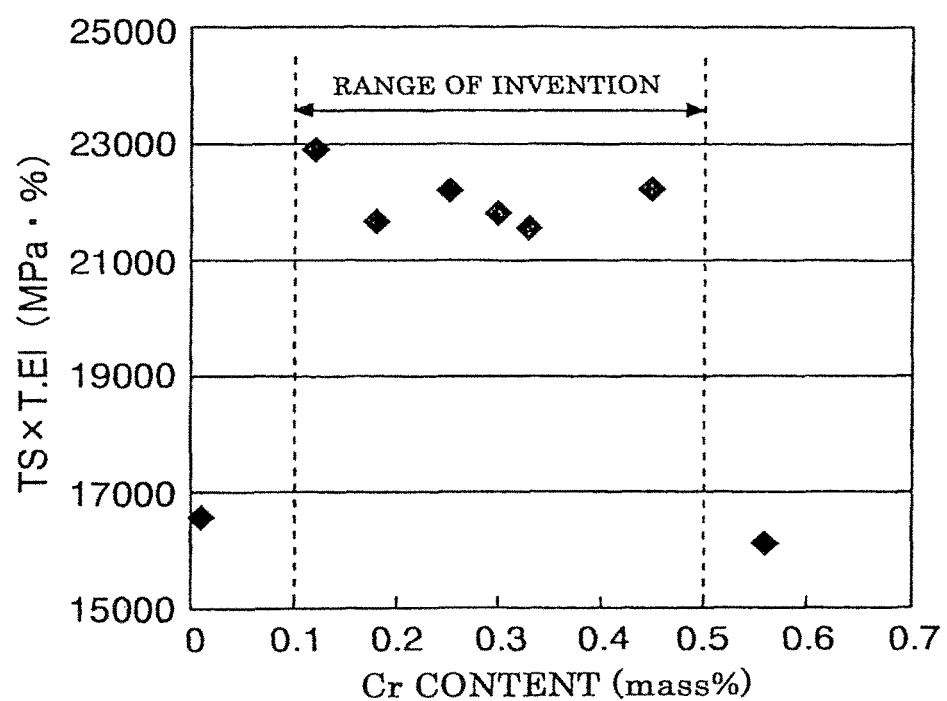
FIG. 5 is a graph showing the relationship between the Cr content and the TS×T. El balance.
Figure 6:
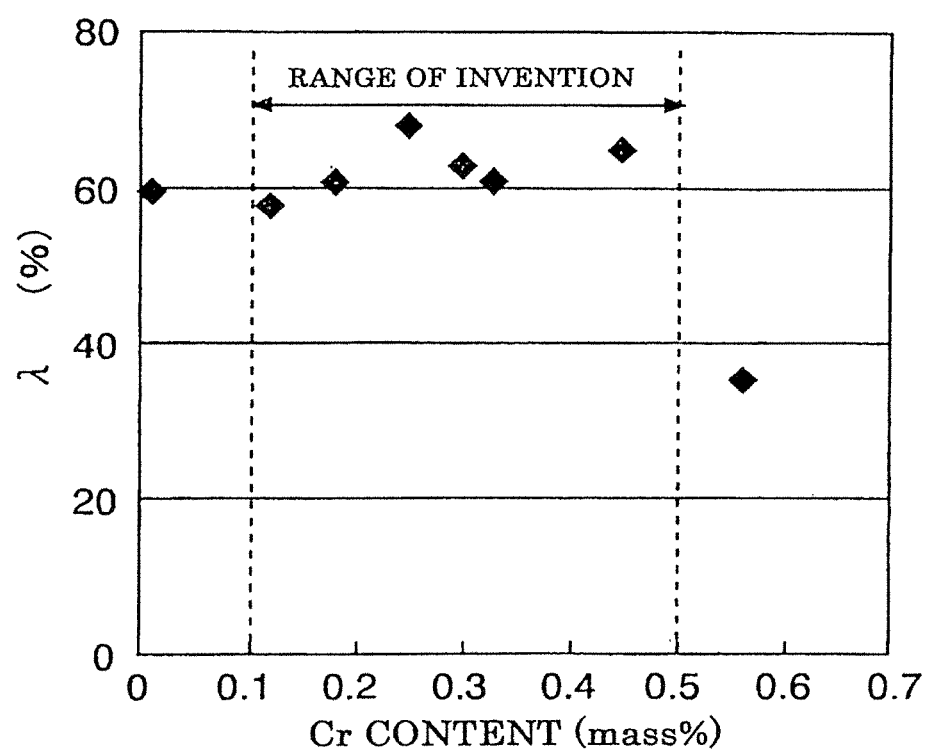
FIG. 6 is a graph showing the relationship between the Cr content and the hole-expanding ratio.

On the basis of the results described above, FIG. 5 shows the Cr content and the TS×T. El balance. FIG. 6 shows the Cr content and the hole-expanding ratio. FIGS. 5 and 6 demonstrate that a Cr content in our range, i.e., a Cr content of 0.1% to 0.5%, results in high ductility and high stretch-flange formability.

The reason for the occurrence of such phenomena is not always clear. In TRIP steel, usually, an increase in the carbon content of retained austenite by bainite transformation enhances stability to effectively utilize the TRIP effect, thereby obtaining high ductility. A low aspect ratio state of a steel sheet containing an appropriate amount of Cr is regarded as a state in which bainite transformation is insufficient. In the steel sheet containing an appropriate amount of Cr, the TRIP effect may be effectively utilized even at a small carbon content. The reason why this phenomenon disappears at an amount of Cr incorporated exceeding 0.5% may be that the TRIP effect is not exerted due to significantly high stability.

We provide a steel sheet having a balance between high ductility and high stretch-flange formability achieved by incorporating an appropriate amount of Cr even in the presence of retained austenite having a low aspect ratio of crystal grains due to insufficient bainite transformation.

The chemical composition of a steel sheet will be described below. The term "%" used in the composition of the steel sheet refers to percent by mass.

C: 0.05% to 0.3%

C is an element which stabilizes austenite, which is required to ensure the amount of martensite, and which allows austenite to remain at room temperature. At a carbon content of less than 0.05%, it is difficult to ensure the strength of a steel sheet and the amount of retained austenite to provide predetermined properties even when manufacturing conditions are optimized. A carbon content exceeding 0.3% significantly hardens a weld zone and a heat-affected zone, thus degrading weldability. From the viewpoint, the carbon content is in the range of 0.05% to 0.3% and preferably 0.05% to 0.2%.

Si: 1.4% or less (including 0%)

Si is an element effective in strengthening steel. Si is an element that forms ferrite. Si suppresses an increase in the carbon content of austenite and suppresses the formation of carbides, thus promoting the formation of retained austenite. Thus, Si is often incorporated in dual-phase steel and TRIP steel.

An excessive amount of Si incorporated causes degradation in formability and toughness due to an increase in the amount of Si dissolved in ferrite, the degradation of a surface state due to the occurrence of red scale and the like, and degradation in the adhesion of a plating film when hot dipping is performed. Therefore, the Si content is set in the range of 1.4% or less (including 0%).

Mn: 0.08% to 3%

Mn is an element which is effective in strengthening steel, which stabilizes austenite, and which is required to increase in the volume of martensite and retained austenite. The effect is exerted at a Mn content of 0.08% or more. An excessive amount of Mn incorporated, i.e., a Mn content exceeding 3%, causes a significant increase in strength due to an excessively large fraction of a second phase and solid-solution strengthening. Therefore, the Mn content is set in the range of 0.08% to 3%.

P: 0.003% to 0.1%

P is an element effective in strengthening steel. This effect is exerted at a P content of 0.003% or more. An excessive amount of P incorporated, i.e., a P content exceeding 0.1%, causes embrittlement due to grain boundary segregation, thereby degrading impact resistance. Therefore, the P content is set in the range of 0.003% to 0.1%.

S: 0.07% or less

S is formed into an inclusion, such as MnS, that causes a deterioration in impact resistance and causes cracks along flow of a metal in a weld zone. Thus, the S content is preferably minimized. From the viewpoint of production costs, the S content is set at 0.07% or less.

Al: 0.1% to 2.5%

Al is an element that forms ferrite. Al suppresses an increase in the carbon content of austenite and suppresses the formation of carbides, thus promoting the formation of retained austenite. Al has the effect of suppressing the degradation of plating properties and a surface state of a plating film due to Si. The effect is exerted at an Al content of 0.1% or more. A large amount of Al is incorporated in dual-phase steel and TRIP steel, in some cases. Excessive incorporation causes embrittlement of ferrite, thereby degrading the strength-ductility balance of the material. An Al content exceeding 2.5% increases the number of inclusions in steel sheet, thus degrading ductility. Therefore, the Al content is set in the range of 0.1% to 0.5%.

Cr: 0.1% to 0.5%

Cr is an element that forms ferrite. Cr suppresses an increase in the carbon content of austenite and suppresses the formation of carbides, thus promoting the formation of retained austenite. An appropriate amount of Cr incorporated results in a satisfactory strength-ductility balance even in the case of retained austenite having a shape relatively close to a block, thereby resulting in a balance between high ductility and high stretch-flange formability. The effect is exerted at a Cr content of 0.1% to 0.5%. Therefore, the Cr content is set in the range of 0.1% to 0.5%.

N: 0.007% or less

N is an element that most degrades the aging resistance of steel. Thus, the N content is preferably minimized. A N content exceeding 0.007% causes significant degradation in aging resistance. Therefore, the N content is set at 0.007% or less.

Si+Al≥0.5%

As described above, each of Si and Al is an element that forms ferrite and has the effect of promoting the formation of retained austenite. To obtain the effect, the content of Si+Al is required to be 0.5% or more. Therefore, the content of Si+Al is set at 0.5% or more.

In addition to the above-described elements, at least one element selected from V and Mo may be incorporated as an optional component.

V: 0.005% to 2%

V suppresses the formation of pearlite during cooling from an annealing temperature and thus may be incorporated, according to need.

Mo: 0.005% to 2%

Mo is effective for delayed fracture resistance and the like and may be incorporated, according to need. The effect is exerted at a Mo content of 0.005% or more. However, a Mo content exceeding 2% degrades formability. Therefore, when Mo is incorporated, the Mo content is set in the range of 0.005% to 2%.

Furthermore, at least one element selected from Ti, Nb, B, Ni, and Cu may be incorporated as an optional component.

Ti: 0.01% to 0.5%, Nb: 0.01% to 0.1%

Ti and Nb are effective for precipitation strengthening and thus may be incorporated, according to need.

The effect is exerted when the Ti content is 0.01% or more or when the Nb content is 0.01% or more. The effect may be utilized to strengthen steel as long as each of the contents is within our specified range. However, in the case of a Ti content exceeding 0.5% or a Nb content exceeding 0.1%, formability and shape fixability are degraded. Therefore, when Ti is incorporated, the Ti content is set in the range of 0.01% to 0.5%. When Ni is incorporated, the Nb content is set in the range of 0.01% to 0.1%.

B: 0.0003% to 0.005%

B has the effect of suppressing the formation of ferrite from austenite grain boundaries and thus may be incorporated, according to need. The effect is exerted at a B content of 0.0003%. However, a B content exceeding 0.005% results in an excessively small amount of ferrite, thus degrading formability. Therefore, when B is incorporated, the B content is set in the range of 0.0003% to 0.005%.

Ni: 0.005% to 2.0%, Cu: 0.005% to 2.0%

Ni and Cu are each an element that stabilizes austenite. Thus, Ni and Cu each have the effect of retaining austenite and increasing strength. The effect is exerted when the Ni content is 0.0005% or more or when the Cu content is 0.0005% or more. However, in the case of a Ni content exceeding 2.0% or a Cu content exceeding 2.0%, the ductility of a steel sheet is degraded. Therefore, when Ni is incorporated, the Ni content is set in the range of 0.005% to 2.0%. When Cu is incorporated, the Cu content is set in the range of 0.005% to 2.0%.

In addition to the above-described elements and the balance Fe, various impurity elements during a production process and additional essential trace elements and the like during the production process are inevitably incorporated. Such inevitable impurities are allowable because they do not affect the effect of our steel sheets.

In our high-strength hot-dip galvanized steel sheets having the above-described composition, the volume fraction of retained austenite and the average aspect ratio of retained austenite grains are specified below.

Retained Austenite Content: 3% or More by Volume Fraction

To effectively utilize the strain-induced transformation of retained austenite during forming, a retained austenite content of 3% or more by volume fraction is required. Therefore, the retained austenite content is set at 3% or more by volume fraction.

Average Aspect Ratio of Retained Austenite Grains: 2.5 or Less

An excessively higher aspect ratio of retained austenite grains degrades stretch-flange formability. Therefore, the average aspect ratio of retained austenite grains is set at 2.5 or less.

An exemplary method for producing a high-strength hot-dip galvanized steel sheet will be described below.

A steel sheet having the above-described composition is annealed for 15 to 600 seconds in a first temperature region having a temperature of 700° C. to 900° C., specifically, in an austenite single-phase region or a two-phase region including an austenite phase and a ferrite phase. When the annealing temperature is less than 700° C. or when the annealing time is less than 15 seconds, in some cases, carbides in the steel sheet do not sufficiently dissolve, and the recrystallization of ferrite is not completed, thereby not obtaining target properties. An annealing temperature exceeding 900° C. causes significant growth of austenite grains. This may reduce the number of nucleation sites for ferrite formed from a second phase during subsequent cooling. An annealing time exceeding 600 seconds consumes a lot of energy, thus disadvantageously increasing costs.

After annealing, the steel sheet is cooled to a second temperature region having a temperature of 350° C. to 600° C. at a cooling rate of 5° C./s or more and is then retained in this temperature region for 5 to 200 seconds. A cooling rate of less than 5° C./s results in the precipitation of pearlite and a significant reduction in the content of carbon dissolved in untransformed austenite. Thus, a target structure is not obtained, in some cases. When the retention time is less than 5 seconds in this temperature region, the stabilization of untransformed austenite does not proceed. As a result, a retained austenite content of 3% or more is not obtained; hence, sufficient ductility is not ensured, in some cases.

When the retention time exceeds 200 seconds, bainite transformation proceeds significantly. As a result, the average aspect ratio of retained austenite grains exceeds 2.5, thereby degrading stretch-flange formability, in some cases. A retention temperature exceeding 600° C. results in the precipitation of carbides from untransformed austenite. A retention temperature of less than 350° C. results in the precipitation of minute carbides in bainitic ferrite due to lower bainite transformation. As a result, stabilized retained austenite is not sufficiently obtained, in some cases.

We conducted studies on heat treatment conditions such that a steel sheet having satisfactory properties is produced more stably, and have found that with respect to heat treatment of the steel sheet after cooling, specifying the second temperature region so as to have a narrower temperature range of 360° C. to 490° C. and controlling the retention time at this temperature region on the basis of Formula (1) stably ensures a retained austenite content of 3% or more and an average aspect ratio of retained austenite of 2.5 or less.

$$5 \leq t \leq 200 - 0.003 \times (T-350)^2 \quad (1)$$

where t represents the total retention time (second) in the temperature region having a temperature of 360° C. to 490° C.; and T represents an average temperature (° C.) when the steel sheet is retained for the total retention time in the temperature region having a temperature of 360° C. to 490° C.

Figure 7:
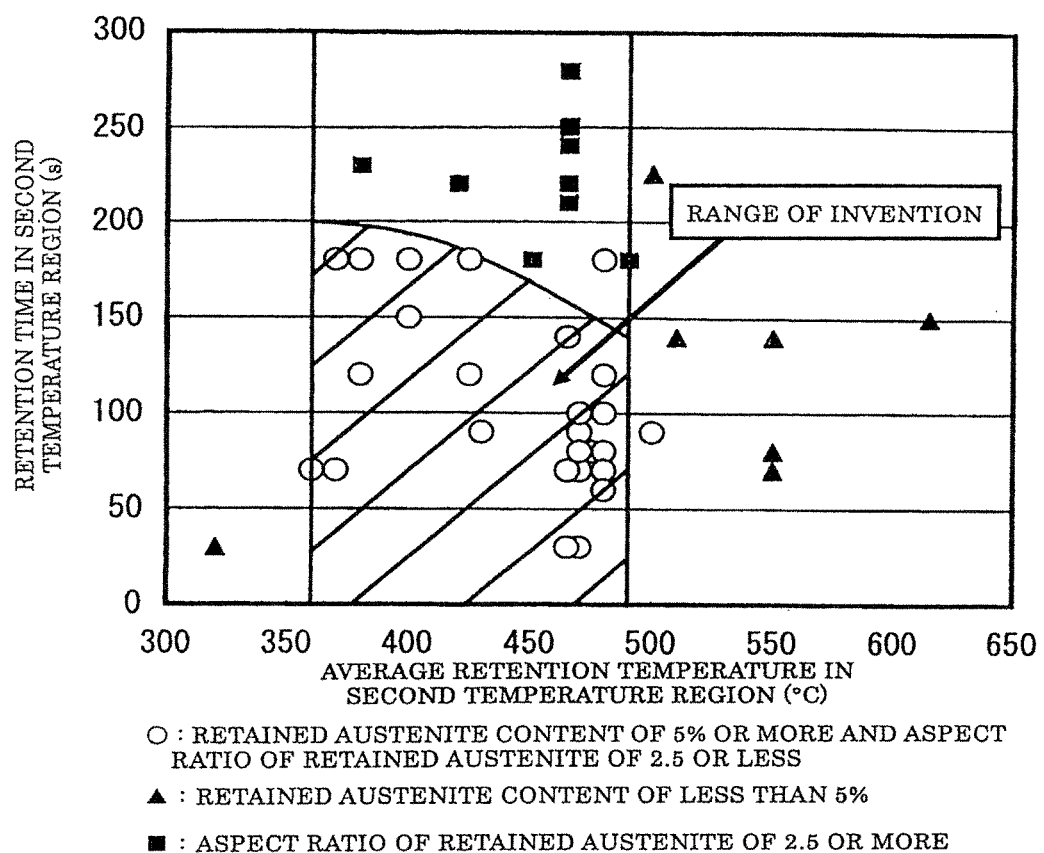
FIG. 7 is a graph showing the relationship between the average retention temperature in a second temperature range and the retention time in the second temperature range.

FIG. 7 shows the relationship among the temperature and the retention time in the second temperature region and the aspect ratio.

The results demonstrate that the control based on Formula (1) stably ensures a retained austenite content of 3% or more and an average aspect ratio of retained austenite of 2.5 or less.

After retention in the second temperature region, hot-dip galvanizing is performed. The temperature of a plating bath may be in a normal range of 450° C. to 500° C. When alloying is performed, treatment is preferably performed at 600° C. or lower. The reason for this is as follows: When the temperature of the plating bath exceeds 600° C., carbides are precipitated from untransformed austenite, as described above. As a result, stable retained austenite is not obtained, thereby degrading ductility.

In a series of heat treatments performed in the production method, the retention temperature need not be a constant as long as it is within the specified range. Even when the cooling rate varies during cooling, there is no problem as long as the cooling rate is within the specified range. The steel sheet may be subjected to heat treatment with any equipment as long as the heat history is satisfied. The steel sheet may be subjected to skin pass rolling for shape correction after heat treatment. The steel sheet is preferably produced through common steps, i.e., steelmaking, casting, and hot rolling. Alternatively, for example, part or the entirety of the hot rolling step may be omitted by employing thin casting or the like.

Examples

Our steel sheets and methods will be described in further detail by means of examples. This disclosure is not limited to these examples. It will be understood that modification may be made without changing the scope of the disclosure.

A cast slab obtained by refining steel having a chemical composition shown in Table 1 was subjected to hot rolling, pickling, and cold rolling to form a cold-rolled steel sheet having a thickness of 1.2 mm. After heat treatment was performed under conditions shown in Tables 2 and 3, plating was performed in a galvanizing bath having a temperature of 463° C. at a weight of 50/50 g/m². Alloying was performed in such a manner that the Fe content of the plating film was 9 percent by mass. The resulting steel sheet was subjected to skin pass rolling at a reduction of 0.3%. The N content of steel was 0.0020 to 0.0060 percent by mass.

The structure of the section (plane parallel to the rolling direction) of the steel sheet was observed with a scanning electron microscope (SEM) at a magnification of ×2,000 from 10 fields of view. The aspect ratio (major axis/minor axis) of each of retained austenite grain was observed, the average value of the resulting aspect ratio values was defined as the average aspect ratio. A sample used for SEM observation was subjected to heat treatment at 200° C. for 2 hours (in order to be formed into an observable sample by separating martensite from retained austenite), mirror polishing, and natal etching. Then the sample was tested. The resulting SEM image was subjected to image processing to determine the content of retained austenite.

The steel sheet was processed into a JIS No. 5 specimen and was subjected to a tensile test. Tensile strength (TS) and total elongation (T. El) were measured to determine the value of a strength-elongation balance expressed by multiplying strength by total elongation (TS×T. El). When TS×T. El 19800 MPa, the balance was determined to be satisfactory.

Stretch-flange formability was evaluated as follows: The resulting steel sheet was cut into a piece having a size of 100 mm×100 mm. A hole having a diameter of 10 mm was made in the piece by punching at a clearance of 12%. A cone punch with a 60° apex was forced into the hole while the piece was fixed with a die having an inner diameter of 75 mm at a blank-holding pressure of 9 ton. The diameter of the hole was measured when a crack was initiated. The maximum hole-expanding ratio λ (%) was determined with Formula (2). Stretch-flange formability was evaluated on the basis of the maximum hole-expanding ratio. When λ 50%, the maximum hole-expanding ratio was determined to be satisfactory.

$$\text{Maximum hole-expanding ratio } \lambda \ (\%) = \{(D_f - D_0)/D_0\} \times 100 \quad (2)$$

where $D_f$ represents the hole diameter (mm) when a crack was initiation; and $D_0$ represents an initial hole diameter (mm).

Tables 2 and 3 also summarize the test results. The results demonstrate that the steel sheet satisfying our specified requirements has an excellent balance between strength and elongation and between strength and stretch-flange formability, and target properties are obtained. Furthermore, the results demonstrate that the production of the steel sheet under the conditions satisfying our specified requirements stably results in the target properties.

TABLE 1

| Type of steel | Chemical composition (% by mass) | | | | | | | | | | | | | |
|---|---|---|---|---|---|---|---|---|---|---|---|---|---|---|
| | C | Si | Mn | Al | P | S | Cr | V | Mo | Ti | Nb | B | Cu | Ni |
| 1 | 0.045 | 0.14 | 1.56 | 0.83 | 0.008 | 0.005 | 0.45 | — | — | — | — | — | — | — |
| 2 | 0.081 | 0.27 | 1.61 | 0.06 | 0.031 | 0.004 | 0.15 | — | — | — | — | — | — | — |
| 3 | 0.081 | 0.30 | 1.84 | 0.50 | 0.031 | 0.006 | 0.30 | — | — | — | — | — | — | — |
| 4 | 0.112 | 0.01 | 1.57 | 1.40 | 0.008 | 0.004 | 0.49 | — | — | — | — | — | — | — |
| 5 | 0.111 | 0.35 | 1.90 | 0.73 | 0.007 | 0.005 | 0.01 | — | — | — | — | — | — | — |
| 6 | 0.137 | 0.01 | 1.56 | 1.48 | 0.008 | 0.004 | 0.56 | — | — | — | — | — | — | — |
| 7 | 0.150 | 029 | 1.69 | 0.71 | 0.008 | 0.006 | 0.25 | — | — | — | — | — | — | — |
| 8 | 0.150 | 0.31 | 1.71 | 0.69 | 0.008 | 0.005 | 0.03 | — | — | — | — | — | — | — |
| 9 | 0.149 | 0.34 | 1.91 | 0.50 | 0.008 | 0.006 | 0.03 | — | — | — | — | — | — | — |
| 10 | 0.149 | 0.48 | 1.70 | 0.51 | 0.028 | 0.003 | 0.18 | — | — | — | — | — | — | — |

TABLE 1-continued

| Type of steel | Chemical composition (% by mass) | | | | | | | | | | | | | |
|---|---|---|---|---|---|---|---|---|---|---|---|---|---|---|
| | C | Si | Mn | Al | P | S | Cr | V | Mo | Ti | Nb | B | Cu | Ni |
| 11 | 0.149 | 0.97 | 1.71 | 0.30 | 0.029 | 0.004 | 0.12 | — | — | — | — | — | — | — |
| 12 | 0.151 | 1.00 | 1.65 | 0.50 | 0.007 | 0.004 | 0.05 | — | — | — | — | — | — | — |
| 13 | 0.160 | 0.01 | 1.92 | 2.17 | 0.008 | 0.003 | 0.31 | — | — | — | — | — | — | — |
| 14 | 0.159 | 0.02 | 1.91 | 1.48 | 0.007 | 0.003 | 0.49 | — | — | — | — | — | — | — |
| 15 | 0.161 | 0.13 | 1.90 | 1.50 | 0.007 | 0.003 | 0.01 | — | — | — | — | — | — | — |
| 16 | 0.162 | 0.24 | 1.60 | 0.73 | 0.008 | 0.006 | 0.45 | — | — | — | — | — | — | — |
| 17 | 0.159 | 0.35 | 1.90 | 0.73 | 0.007 | 0.006 | 0.02 | — | — | — | — | — | — | — |
| 18 | 0.159 | 0.49 | 1.91 | 1.48 | 0.007 | 0.003 | 0.27 | — | — | — | — | — | — | — |
| 19 | 0.160 | 0.45 | 1.92 | 1.49. | 0.007 | 0.003 | 0.01 | — | — | — | — | — | — | — |
| 20 | 0.166 | 0.01 | 0.91 | 1.02 | 0.007– | 0.004 | 0.38 | — | — | — | — | — | — | — |
| 21 | 0.171 | 0.33 | 1.70 | 0.73 | 0.008 | 0.006 | 0.30 | — | — | — | — | — | — | — |
| 22 | 0.166 | 0.26 | 1.74 | 0.75 | 0.007 | 0.006 | 0.33 | — | — | — | — | — | — | — |
| 23 | 0.171 | 0.34 | 1.70 | 0.73 | 0.008 | 0.004 | 0.01 | — | — | — | — | — | — | — |
| 24 | 0.169 | 1.34 | 1.65 | 0.21 | 0.028 | 0.003 | 0.25 | — | — | — | — | — | — | — |
| 25 | 0.150 | 0.28 | 1.67 | 0.74 | 0.008 | 0.004 | 0.29 | 0.13 | — | — | — | — | — | — |
| 26 | 0.191 | 0.46 | 1.71 | 1.46 | 0.010 | 0.005 | 0.34 | — | 0.11 | — | — | — | — | — |
| 27 | 0.154 | 0.31 | 1.59 | 0.75 | 0.008 | 0.004 | 0.15 | — | — | 0.26 | — | — | — | — |
| 28 | 0.155 | 0.28 | 1.62 | 0.77 | 0.007 | 0.005 | 0.21 | — | — | — | 0.031 | — | — | — |
| 29 | 0.155 | 0.71 | 1.62 | 0.76 | 0.007 | 0.004 | 0.12 | — | — | — | — | 0.001 | — | — |
| 30 | 0.155 | 0.30 | 1.44 | 0.78 | 0.008 | 0.005 | 0.45 | — | — | — | — | — | 0.31 | — |
| 31 | 0.134 | 0.29 | 1.30 | 0.75 | 0.007 | 0.004 | 0.30 | — | — | — | — | — | — | 0.19 |

TABLE 2

| No. | Type of steel | Retention temperature and time in first temperature region | | Cooling rate | Retention temperature and time in second temperature region | | $200 - 0.003 \times (T - 350)^2$ | Amount of retained austenite (vol. %) | Aspect ratio | Mechanical properties | | | | Remarks |
|---|---|---|---|---|---|---|---|---|---|---|---|---|---|---|
| | | (C.) | (s) | (C./s) | T (° C.) | T(s) | | | | TS (MPa) | T. El (%) | TS × T. El | X (%) | |
| 1 | 1 | 820 | 180 | 10 | 470 | 80 | 157 | 0.9 | —* | 482 | 35.0 | 16870 | 63 | Comparative example |
| 2 | 2 | 820 | 180 | 8 | 470 | 80 | 157 | 0.6 | —* | 520 | 29.1 | 15132 | 65 | Comparative example |
| 3 | 3 | 820 | 180 | 10 | 470 | 90 | 157 | 8.7 | 1.7 | 615 | 35.5 | 21833 | 63 | Inventive example |
| 4 | 4 | 850 | 180 | 10 | 480 | 120 | 149 | 10.5 | 1.9 | 620 | 35.8 | 22196 | 55 | Inventive example |
| 5 | 5 | 810 | 180 | 10 | 470 | 20 | 157 | 11.3 | 1.1 | 730 | 22.0 | 16060 | 63 | Comparative example |
| 6-1 | 6 | 820 | 180 | 10 | 465 | 80 | 160 | 11.0 | 1.7 | 811 | 19.8 | 16058 | 35 | Comparative example |
| 6-2 | 6 | 820 | 180 | 10 | 465 | 80 | 160 | 9.8 | 1.4 | 820 | 20.0 | 16400 | 32 | Comparative example |
| 6-3 | 6 | 820 | 180 | 10 | 465 | 150 | 160 | 10.7 | 1.9 | 805 | 21.2 | 17066 | 32 | Comparative example |
| 7 | 7 | 820 | 180 | 10 | 470 | 70 | 157 | 11.2 | 1.6 | 802 | 27.7 | 22215 | 68 | Inventive example |
| 8 | 8 | 820 | 180 | 8 | 470 | 100 | 157 | 12.1 | 3.5 | 598 | 35.2 | 21050 | 30 | Comparative example |
| 9 | 9 | 810 | 180 | 8 | 470 | 80 | 157 | 10.9 | 2.7 | 795 | 24.1 | 19160 | 35 | Comparative example |
| 10 | 10 | 820 | 180 | 10 | 475 | 80 | 153 | 11.5 | 1.6 | 797 | 27.2 | 21678 | 61 | Inventive example |
| 11-1 | 11 | 820 | 180 | 10 | 470 | 30 | 157 | 10.5 | 1.4 | 830 | 26.8 | 22244 | 57 | Inventive example |
| 11-2 | 11 | 820 | 180 | 50 | 430 | 90 | 181 | 12.3 | 1.6 | 870 | 25.0 | 21750 | 60 | Inventive example |
| 11-3 | 11 | 830 | 200 | 10 | 400 | 180 | 193 | 9.5 | 1.9 | 820 | 29.0 | 23780 | 52 | Inventive example |
| 11-4 | 11 | 820 | 200 | 20 | 370 | 180 | 199 | 8.4 | 1.9 | 835 | 27.0 | 22545 | 53 | Inventive example |
| 11-5 | 11 | 800 | 180 | 40 | 320 | 30 | 197 | 4.9 | 1.2 | 875 | 18.0 | 15750 | 30 | Comparative example |
| 11-6 | 11 | 820 | 210 | 20 | 420 | 220 | 185 | 10.0 | 2.7 | 835 | 27.3 | 22796 | 28 | Comparative example |
| 11-7 | 11 | 840 | 210 | 40 | 380 | 230 | 197 | 9.3 | 3.0 | 860 | 25.0 | 21500 | 22 | Comparative example |
| 11-8 | 11 | 800 | 180 | 40 | 550 | 140 | 80 | 2.3 | 1.5 | 860 | 20.0 | 17200 | 25 | Comparative example |
| 12 | 12 | 820 | 180 | 10 | 470 | 80 | 157 | 12.7 | 3.3 | 630 | 35.0 | 22050 | 21 | Comparative example |
| 13 | 13 | 050 | 180 | 10 | 470 | 70 | 157 | 15.2 | 1.6 | 860 | 26.8 | 23048 | 62 | inventive example |
| 14 | 14 | 810 | 180 | 8 | 480 | 180 | 149 | 11.7 | 2.1 | 830 | 27.5 | 22825 | 58 | Inventive example |
| 15-1 | 15 | 820 | 180 | 8 | 465 | 30 | 160 | 11.6 | 1.1 | 850 | 21.1 | 17935 | 58 | Comparative example |
| 15-2 | 15 | 810 | 180 | 10 | 465 | 80 | 160 | 10.2 | 3.1 | 832 | 25.5 | 21216 | 32 | Comparative example |
| 15-3 | 15 | 840 | 180 | 10 | 465 | 150 | 160 | 9.8 | 3.7 | 820 | 27.0 | 22140 | 25 | Comparative example |
| 15-4 | 15 | 820 | 180 | ·10 | 465 | 220 | 160 | 8.5 | 3.9 | 820 | 25.7 | 21074 | 14 | Comparative example |
| 15-5 | 15 | 820 | 180 | 8 | L 465 | 250 | 160 | 8.2 | 4.0 | 820 | 23.5 | 19270 | 16 | Comparative example |
| 16 | 16 | 820 | 180 | 10 | 480 | 120 | 149 | 10.9 | 1.6 | 855 | 26.0 | 22230 | 65 | Inventive example |
| 17 | 17 | 810 | 180 | 10 | 470 | 80 | 157 | 12.5 | 2.3 | 875 | 18.5 | 16188 | 61 | Comparative example |
| 18 | 18 | 810 | 180 | 10 | 470 | 70 | 157 | 16.1 | 1.6 | 838 | 28.2 | 23632 | 58 | Inventive example |
| 19 | 19 | 820 | 180 | 10 | 470 | 150 | 157 | 11.5 | 4.1 | 820 | 27.0 | 22140 | 15 | Comparative example |
| 20-1 | 20 | 810 | 180 | 8 | 480 | 100 | .149 | 12.1 | 1.9 | 815 | 27.0 | 22005 | 62 | Inventive example |
| 20-2 | 20 | 840 | 180 | 15 | 550 | 80 | 80 | 1.7 | _* | 830 | 21.0 | 17430 | 42 | Comparative example |
| 20-3 | 20 | 810 | 180 | 20 | 425 | 180 | 1683 | 11.5 | 1.9 | 835 | 26.5 | 22128 | 55 | Inventive example |

*It was impossible to measure the aspect ratio because of a small volume fraction

TABLE 3

| No. | Type of steel | Retention temperature and time in first temperature region (° C.) | | Cooling rate (° C./s) | Retention temperature and time in second temperature region | | 200 − 0.003 × (T − 350)$^2$ | Amount of retained austenite (vol. %) | Aspect ratio | Mechanical properties | | | | Remarks |
|---|---|---|---|---|---|---|---|---|---|---|---|---|---|---|
| | | (° C.) | (s) | (° C./s) | T (° C.) | T (s) | | | | TS (MPa) | T. El (%) | TS × T. El | X (%) | |
| 20-4 | 20 | 815 | 180 | 40 | 400 | 150 | 193 | 10.3 | 1.8 | 830 | 27.2 | 22576 | 53 | Inventive example |
| 20-5 | 20 | 795 | 180 | 20 | 380 | 120 | 197 | 12.0 | 1.7 | 825 | 25.1 | 20708 | 55 | Inventive example |
| 20-6 | 20 | 820 | 200 | 20 | 450 | 180 | 170 | 11.5 | 2.6 | 820 | 27.0 | 22140 | 45 | Comparative example |
| 20-7 | 20 | 830 | 200 | 30 | 490 | 180 | 141 | 12.0 | 3.0 | 825 | 25.1 | 20708 | 55 | Comparative example |
| 20-8 | 20 | 800 | 200 | 20 | 500 | 225 | 133 | 2.1 | 1.7 | 840 | 21.0 | 17640 | 42 | Comparative example |
| 21-1 | 21 | 820 | 180 | 10 | 465 | 30 | 160 | 12.1 | 1.1 | 824 | 25.5 | 21012 | 71 | Inventive example |
| 21-2 | 21 | 820 | 180 | 10 | 465 | 70 | 160 | 11.8 | 1.6 | 820 | 26.9 | 22058 | 61 | Inventive example |
| 21-3 | 21 | 820 | 180 | 10 | 465 | 140 | 160 | 11.6 | 2.1 | 815 | 27.0 | 22005 | 58 | Inventive example |
| 21-4 | 21 | 820 | 180 | 10 | 465 | 210 | 160 | 10.9 | 2.9 | 824 | 27.5 | 22660 | 45 | Comparative example |
| 21-5 | 21 | 820 | 180 | 10 | 465 | 240 | 160 | 11.7 | 3.4 | 810 | 27.6 | 22356 | 25 | Comparative example |
| 21-6 | 21 | 820 | 180 | 10 | 465 | 280 | 160 | 9.8 | 3.9 | 803 | 26.7 | 21440 | 15 | Comparative example |
| 21-7 | 21 | 680 | 180 | 10 | 465 | 140 | 160 | 1.5 | —* | 630 | 37.0 | 17010 | 48 | Comparative example |
| 21-8 | 21 | 820 | 180 | 7 | 615 | 150 | −11 | 2.1 | —* | 645 | 26.1 | 16835 | 52 | Comparative example |
| 21-9 | 21 | 820 | 180 | 20 | 200 | 150 | 133 | 2.2 | —* | 870 | 22.5 | 19575 | 10 | Comparative example |
| 21-10 | 21 | 820 | 300 | 3 | 4665 | 150 | 160 | 1.9 | —* | 650 | 27.0 | 17550 | 53 | Comparative example |
| 22-1 | 22 | 820 | 180 | 15 | 360 | 70 | 200 | 11.4 | 1.6 | 860 | 25.1 | 21586 | 61 | Inventive example |
| 22-2 | 22 | 820 | 180 | 15 | 470 | 80 | 157. | 10.5 | 1.7 | 820 | 27.0 | 22140 | 65 | Inventive example |
| 22-3 | 22 | 820 | 180 | 10 | 500 | 90 | 133 | 9.8 | −1.6 | 840 | 25.2 | 21168 | 60 | Inventive example |
| 22-4 | 22 | 840 | 180 | 30 | 425 | 120 | 183 | 12.0 | 1.9 | 815 | 28.0 | 22902 | 55 | Inventive example |
| 22-5 | 22 | 800 | 210 | 20 | 380 | 180 | 197 | 11.3 | 1.8 | 820 | 27.3 | 22386 | 52 | Inventive example |
| 23 | 23 | 820 | 180 | 8 | 470 | 80 | 157 | 13.1 | 1.6 | 826 | 19.2 | 16550 | 60 | Comparative example |
| 24-1 | 24 | 820 | 180 | 10 | 470 | 100 | 157 | 12.1 | 1.9 | 862 | 26.4 | 22757 | 60 | Inventive example |
| 24-2 | 24 | 830 | 200 | 30 | 425 | 180 | 183 | 12.3 | 1.9 | 820 | 29.0 | 23780 | 52 | Inventive example |
| 24-3 | 24 | 800 | 180 | 30 | 370 | 70 | 199 | 8.2 | 1.7 | 840 | 27.5 | 23100 | 53 | Inventive example |
| 244 | 24 | 800 | 180 | 30 | 510 | 140 | 123 | 4.5 | 2.2 | 845 | 23.0 | 19435 | 49 | Comparative example |
| 25 | 25 | 820 | 180 | 8 | 480 | 100 | 149 | 13.1 | 2.4 | 789 | 28.0 | 22092 | 55 | Inventive example |
| 26 | 26 | 840 | 180 | 10 | 480 | 60 | 149 | 12.6 | 1.3 | 1006 | 21.7 | 21830 | 58 | Inventive example |
| 27 | 27 | 820 | 180 | 8 | 480 | 70 | 149 | 9.8 | 1.5 | 840 | 26.0 | 21840 | 61 | Inventive example |
| 28 | 28 | 820 | 180 | 10 | 480 | 70 | 149 | 10.9 | 1.6 | 855 | 25.8 | 22059 | 63 | Inventive example |
| 29-1 | 29 | 820 | 180 | 8 | 480 | 80 | 149 | 9.9 | 1.6 | 917 | 25.0 | 22925 | 58 | Inventive example |
| 29-2 | 29 | 820 | 180 | 15 | 400 | 180 | 193 | 10.5 | 1.8 | 860 | 25.0 | 22925 | 58 | Inventive example |
| 30 | 30 | 820 | 180 | 10 | 480 | 120 | 149 | 11.8 | 1.6 | 815 | 27.0 | 22005 | 59 | Inventive example |
| 31 | 31 | 820 | 180 | 8 | 480 | 80 | 149 | 12.5 | 1.5 | 818 | 26.8 | 21922 | 51 | Inventive example |

*It was impossible to measure the aspect ratio because of a small volume fraction

INDUSTRIAL APPLICABILITY

We provide lightweight, high-strength steel sheets having excellent formability for vehicles such as automobiles.

The invention claimed is:

1. A method for producing a high-strength hot-dip galvanized steel sheet excellent in formability, the method comprising:
    annealing a steel sheet in a first temperature region having a temperature of 700° C. to 900° C. for 15 to 600 seconds, the steel sheet containing, on the basis of mass percent, 0.05-0.3% C, 1.4% or less (including 0%) Si, 0.08%-3% Mn, 0.003-0.1% P, 0.07% or less S, 0.1-2.5% Al, 0.10-0.50% Cr, and 0.007% or less N, Si+Al≥0.5%, and the balance being Fe and incidental impurities; and
    cooling the steel sheet to a second temperature region having a temperature of 360° C. to 490° C. at a cooling rate of 5° C./s or more, wherein a retention time in the second temperature region is controlled on the basis of Formula (1):

$$5 \leq t \leq 200 - 0.003 \times (T-350)^2 \quad (1)$$

where t represents the total retention time (second) in the temperature region having a temperature of 360° C. to 490° C., and T represents an average temperature (° C.) when the steel sheet is retained for the total retention time in the temperature region having a temperature of 360° C. to 490° C.,
    wherein the high-strength hot-dip galvanized steel sheet contains a retained austenite having an average aspect ratio of 2.4 or less.

2. The method for producing the high-strength hot-dip galvanized steel sheet excellent in formability according to claim 1, wherein the steel sheet further comprises, on the basis of mass percent, at least one element selected from 0.005-2% V and 0.005-2% Mo.

3. The method for producing the high-strength hot-dip galvanized steel sheet excellent in formability according to claim 2, wherein the steel sheet further comprises, on the basis of mass percent, at least one element selected from 0.01-0.5% Ti, 0.01-0.1% Nb, 0.0003-0.005% B, 0.005-2.0% Ni, and 0.005-2.0% Cu.

4. The method for producing the high-strength hot-dip galvanized steel sheet excellent in formability according to claim 1, wherein the steel sheet further comprises, on the basis of mass percent, at least one element selected from 0.01-0.5% Ti, 0.01-0.1% Nb, 0.0003-0.005% B, 0.005-2.0% Ni, and 0.005-2.0% Cu.

5. The method for producing a high-strength hot-dip galvanized steel sheet excellent in formability according to claim 1, wherein the steel sheet is annealed in a first temperature region having a temperature of 700° C. to 900° C. for 180 to 600 seconds.

* * * * *